US012799959B2

(12) United States Patent
Trygubova et al.

(10) Patent No.: US 12,799,959 B2
(45) Date of Patent: Nov. 17, 2026

(54) MULTI-DWELLING UNIT (MDU) MOUNT

(71) Applicant: DISH Network L.L.C., Englewood, CO (US)

(72) Inventors: Svitlana Trygubova, Lakewood, CO (US); Aaron William Schwartz, Denver, CO (US); Clark Hurst Pendery, Englewood, CO (US); Ryan Burr Scribner, Erie, CO (US); Joshua D. Wade, Castle Rock, CO (US); Jason Anthony Madruga, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 64 days.

(21) Appl. No.: 18/940,577

(22) Filed: Nov. 7, 2024

(65) Prior Publication Data

US 2026/0126066 A1 May 7, 2026

(51) Int. Cl.
*F16B 2/22* (2006.01)
*H04N 5/64* (2006.01)

(52) U.S. Cl.
CPC *F16B 2/22* (2013.01); *H04N 5/64* (2013.01)

(58) Field of Classification Search
CPC .................................... F16B 2/22; H04N 5/64
USPC ........................................................ 248/316.7
See application file for complete search history.

(56) References Cited

U.S. PATENT DOCUMENTS

| | | | | |
|---|---|---|---|---|
| 5,052,943 A * | 10/1991 | Davis | H01R 13/2442 | 439/298 |
| 5,480,115 A * | 1/1996 | Haltof | F16M 11/041 | 248/221.11 |
| 6,095,470 A * | 8/2000 | Kalis | B60R 11/0241 | 379/455 |
| 6,848,662 B2 * | 2/2005 | Paramonoff | G06F 1/1626 | 248/689 |
| 7,034,902 B2 * | 4/2006 | Tajima | H04N 5/64 | 248/221.11 |
| 9,570,249 B1 * | 2/2017 | Douglas | H01H 9/025 | |
| 2015/0077925 A1 * | 3/2015 | Hunt | H04N 5/64 | 361/679.39 |

* cited by examiner

*Primary Examiner* — Anita M King
(74) *Attorney, Agent, or Firm* — Kilpatrick Townsend & Stockton LLP

(57) ABSTRACT

A television receiver mounting device includes a frame body. Interior surfaces of the frame body form an opening at a first end of the frame body. The opening allows a television receiver to removably be inserted into the frame body. The television receiver mounting device further includes a mounting bracket coupled to the frame body defining one or more attachment points for one or more fasteners and a spring clip extending away from the frame body beyond the opening at the first end of the frame body. The spring clip is configured to removably secure television receiver within the frame body when the television receiver is installed into the frame body through the opening.

20 Claims, 10 Drawing Sheets

MULTI-DWELLING UNIT (MDU) MOUNT

BACKGROUND OF THE INVENTION

Set top boxes (STBs) are information appliances that turn source signals into content in a form that can be displayed and viewed by a user via another electronic device, such as a television or the like. Historically, set top boxes are designed to be placed next to or on top of a television set. However, as technology of display devices including televisions progresses, it is desirable to update accessories such as the STBs.

BRIEF SUMMARY OF THE INVENTION

According to one embodiment, a television receiver mounting device includes a frame body. Interior surfaces of the frame body form an opening at a first end of the frame body. The opening allows a television receiver to removably be inserted into the frame body. The television receiver mounting device further includes a mounting bracket coupled to the frame body defining one or more attachment points for one or more fasteners and a spring clip extending away from the frame body beyond the opening at the first end of the frame body. The spring clip is configured to removably secure television receiver within the frame body when the television receiver is installed into the frame body through the opening.

The television receiver mounting device may include various optional embodiments. The spring clip, the mounting bracket, and the frame body may form a single unitary piece. The spring clip may extend past one or more of a first side and a second side of the frame body. The opening may be defined between the first side and the second side. The mounting bracket may be mountable to an electronic device. One or more of the interior surfaces of the frame body may include one or more projections for the television receiver to be snug fit within the frame body. The frame body may include a cable connector portion. The spring clip may flex until the television receiver is fully inserted and the spring clip may return to an unflexed position such that the spring clip engages with at least one sides of the television receiver. More than 50% of a front surface and/or a back surface of the television receiver may be exposed when the television receiver is installed into the frame body. The television receiver may be a set top box.

A system for mounting a television receiver includes a television receiver including at least a front side and a back side and a mounting device including a frame body where interior surfaces of the frame body form an opening at a first end of the frame body and where the television receiver is slidably installed within the frame body through the opening. The mounting device includes a spring clip extending away from the frame body and beyond the opening at the first end of the frame body. The spring clip removably secures the television receiver within the frame body when the television receiver is installed into the frame body through the opening.

The system may include various optional embodiments. The system may further include a mounting bracket coupled to the frame body defining one or more attachment points for one or more fasteners. The mounting bracket may be mountable to an electronic device. The opening of the frame body may be defined by at least a first side and a second side of the frame body. The front side of the television receiver may slidably interface with the first side of the frame body and the back side of the television receiver may slidably interface with the second side of the frame body. More than 50% of the front side may be exposed through the first side of the frame body when the television receiver is installed into the frame body. More than 50% of the back side may be exposed through the second side of the frame body when the television receiver is installed into the frame body. The spring clip may extend past one or more of the first side and the second side of the frame body. The spring clip and the frame body may form a single unitary piece. The television receiver is a set top box.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

Figure 1:
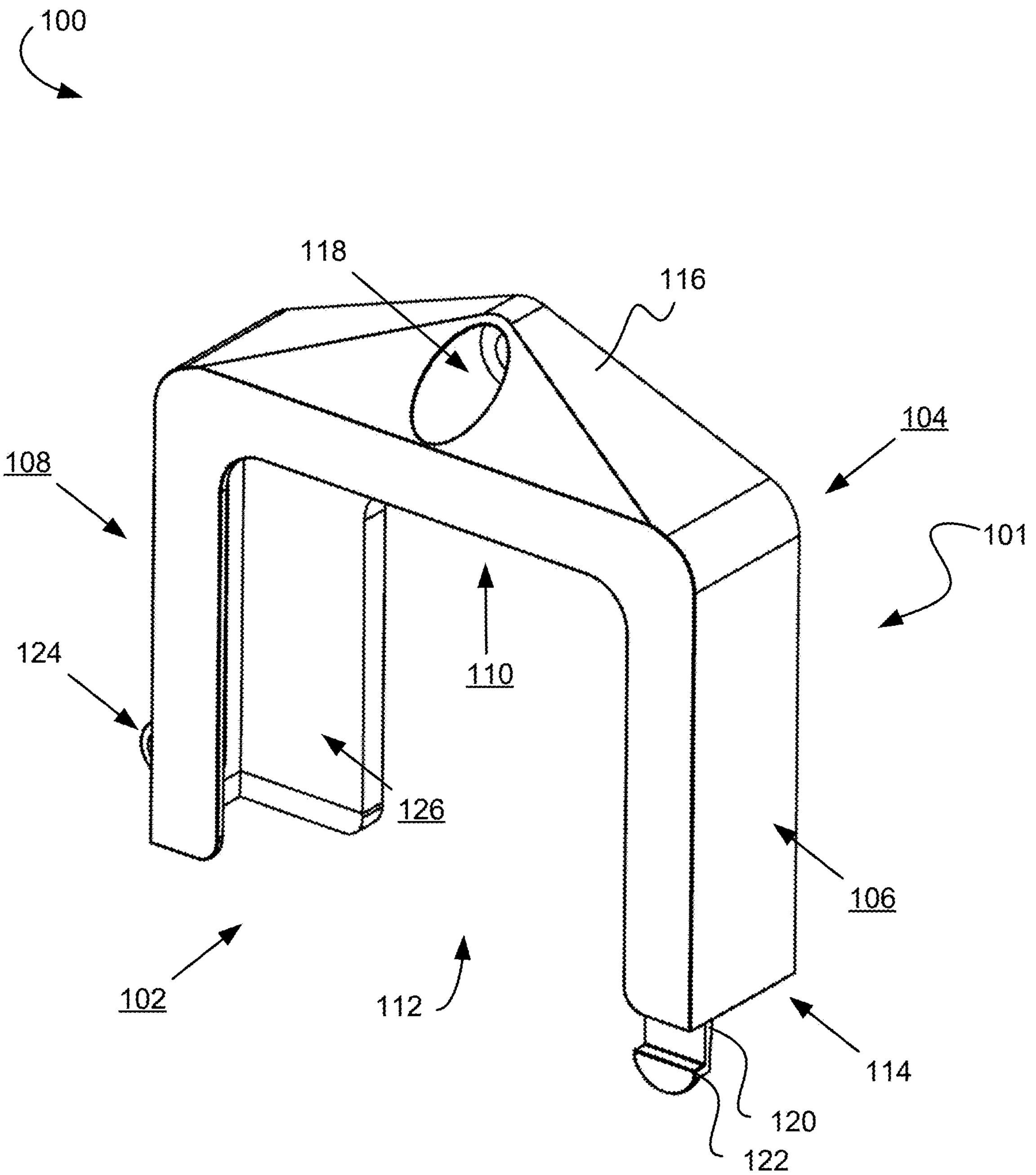
FIG. 1 is an isometric front view of an MDU mount, according to various embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION OF THE INVENTION

Set top boxes (STBs) are used in cable television, satellite television, over-the-air television, Internet Protocol television systems, other digital media players, etc. STBs may receive signals from an Ethernet cable, a satellite dish, a coaxial cable, a telephone line, antennas, etc. STBs are conventionally stored and positioned adjacent to or on top of the television itself. With the rise of thinner televisions and display devices, it would be advantageous to update the design of associated STBs or the like. It may be undesirable to have a bulky STB on display in contrast to a slim and modern television. Accordingly, embodiments of the present disclosure may include an STB mounting device that may be mounted to the back of a television or the like to be hidden away from the view of a user. Further embodiments of the present disclosure minimize the amount of material used to form the STB mounting device to reduce the weight of the system and the overall amount of material needed to manufacture the STB mounting device. An STB mounting device may be further advantageous for use in a multi-dwelling unit (e.g., a dormitory, an apartment building, a condominium, etc.) where multiple separate housing units for residential inhabitants are contained within one building or several buildings within one complex.

Although set top boxes may be as an exemplary embodiment throughout the present disclosure, it should be understood that STB may be used interchangeably to refer to any television receiver or similar device. Accordingly, various embodiments may be used for mounting other electrical equipment as desired.

Referring now to the figures, FIG. 1 is an isometric front view of an MDU mount 100. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 126 that engages with or otherwise slidably interfaces an STB inserted into the frame body 101.

In at least some embodiments, the MDU mount 100 further includes a mounting bracket 116 coupled to the frame body 101. The mounting bracket 116 may define one or more attachment points 118 for one or more fasteners (not shown). In various embodiments, the one or more attachment points 118 are sized and shaped for fasteners that are designed for mounting to a television or other electronic device. The one or more attachment points 118 may be further used with fasteners such as screws, nails, adhesives, or the like.

According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 1) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 1.

As shown in FIG. 1, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 1. In other embodiments, the stepped feature 122 and the spring clip 120 do not extend past the first end 114 of the frame body 101 and are not visible from a front view of the MDU mount 100.

According to at least some embodiments, the front side 102 and/or the back side 104 may have a portion removed such that at least 50% of the STB installed therein (not shown) is exposed through the front side 102 and/or the back side 104, to be described in further detail below. Having most of the front side 102 and/or the back side 104 of the frame body 101 removed reduces the amount of material used to form the MDU mount 100 and further reduces the weight of the MDU mount 100. Reducing the weight is especially advantageous as the MDU mount 100 may be mounted to an electronic device such as a television. Additionally, exposing one or more sides of the STB enables a user to view any status lights, use any buttons, etc., without removing the STB from the frame body 101 of the MDU mount 100. In yet further embodiments, exposing one or more sides of the STB enables a user to read a label, scan a bar code on the inserted unit, etc.

In some embodiments, the frame body 101 includes at least one cable connector portion 124. The cable connector portion 124 may include an aperture, tie, or other means for gathering the cables of the STB and route them around the MDU mount 100. For example, it may be desirable for all the wires to be grouped together rather than loose and potentially tangled amongst one another as the wires extend from the STB and the MDU mount 100.

According to various embodiments, each of the front side 102, the back side 104, the right side 106, the left side 108, and the top side 110 includes an interior surface 126. Each interior surface 126 may interface with a corresponding surface of the STB when the STB is installed in the frame body 101 of the MDU mount 100. For example, at least the front side 102, the back side 104, the right side 106, and the left side 108 of the frame body 101 slidably interface with corresponding sides of the STB when the STB is inserted into the frame body 101.

One or more of the interior surfaces 126 of the frame body 101 includes one or more projections (not visible in this view) for the STB to be snug fit within the frame body 101. The one or more projections may provide frictional force which further maintains the STB within the frame body 101 once the STB is inserted into the frame body 101. Furthermore, the one or more projections on the interior surfaces 126 provide structural integrity to the frame body 101.

Figure 2:
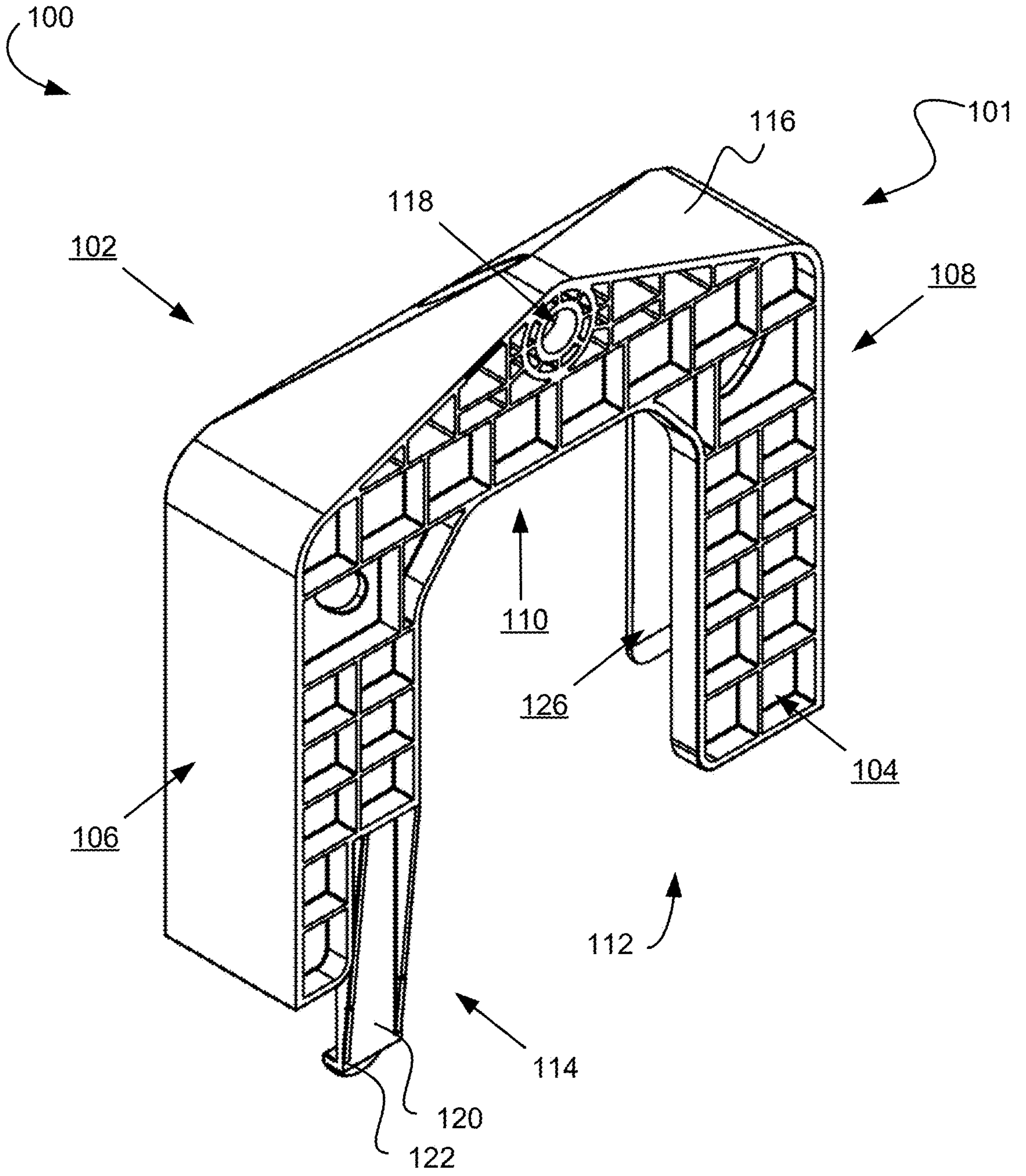
FIG. 2 is an isometric rear view of the MDU mount of FIG. 1, according to various embodiments of the present disclosure.

FIG. 2 is an isometric rear view of the MDU mount of FIG. 1. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 120 that engages with or otherwise slidably interfaces an STB inserted into the frame body 101.

In at least some embodiments, the MDU mount 100 further includes a mounting bracket 116 coupled to the frame body 101. The mounting bracket 116 may define one or more attachment points 118 for one or more fasteners (not shown). In various embodiments, the one or more attachment points 118 are sized and shaped for fasteners that are designed for mounting to a television or other electronic device. The one or more attachment points 116 may be further used with fasteners such as screws, nails, adhesives, or the like.

According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 2) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 2.

As shown in FIG. 2, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 2. In other embodiments, the stepped feature 122 and the spring clip 120 do not extend past the first end 114 of the frame body 101 and are not visible from a front view of the MDU mount 100.

According to at least some embodiments, the front side 102 and/or the back side 104 may have a portion removed such that at least 50% of the STB installed therein (not shown) is exposed through the front side 102 and/or the back side 104, to be described in further detail below. Having most of the front side 102 and/or the back side 104 of the frame body 101 removed reduces the amount of material used to form the MDU mount 100 and further reduces the weight of the MDU mount 100. Reducing the weight is especially advantageous as the MDU mount 100 may be mounted to an electronic device such as a television. Additionally, exposing one or more sides of the STB enables a user to view any status lights, use any buttons, etc., without removing the STB from the frame body 101 of the MDU mount 100. In yet further embodiments, exposing one or more sides of the STB enables a user to read a label, scan a bar code on the inserted unit, etc.

According to various embodiments, each of the front side 102, the back side 104, the right side 106, the left side 108, and the top side 110 includes an interior surface 126. Each interior surface 126 may interface with a corresponding surface of the STB when the STB is installed in the frame body 101 of the MDU mount 100. For example, at least the front side 102, the back side 104, the right side 106, and the left side 108 of the frame body 101 slidably interface with corresponding sides of the STB when the STB is inserted into the frame body 101.

One or more of the interior surfaces 126 of the frame body 101 includes one or more projections (not visible in this view) for the STB to be snug fit within the frame body 101. The one or more projections may provide frictional force which further maintains the STB within the frame body 101 once the STB is inserted into the frame body 101. Furthermore, the one or more projections on the interior surfaces 126 provide structural integrity to the frame body 101.

Figure 3:
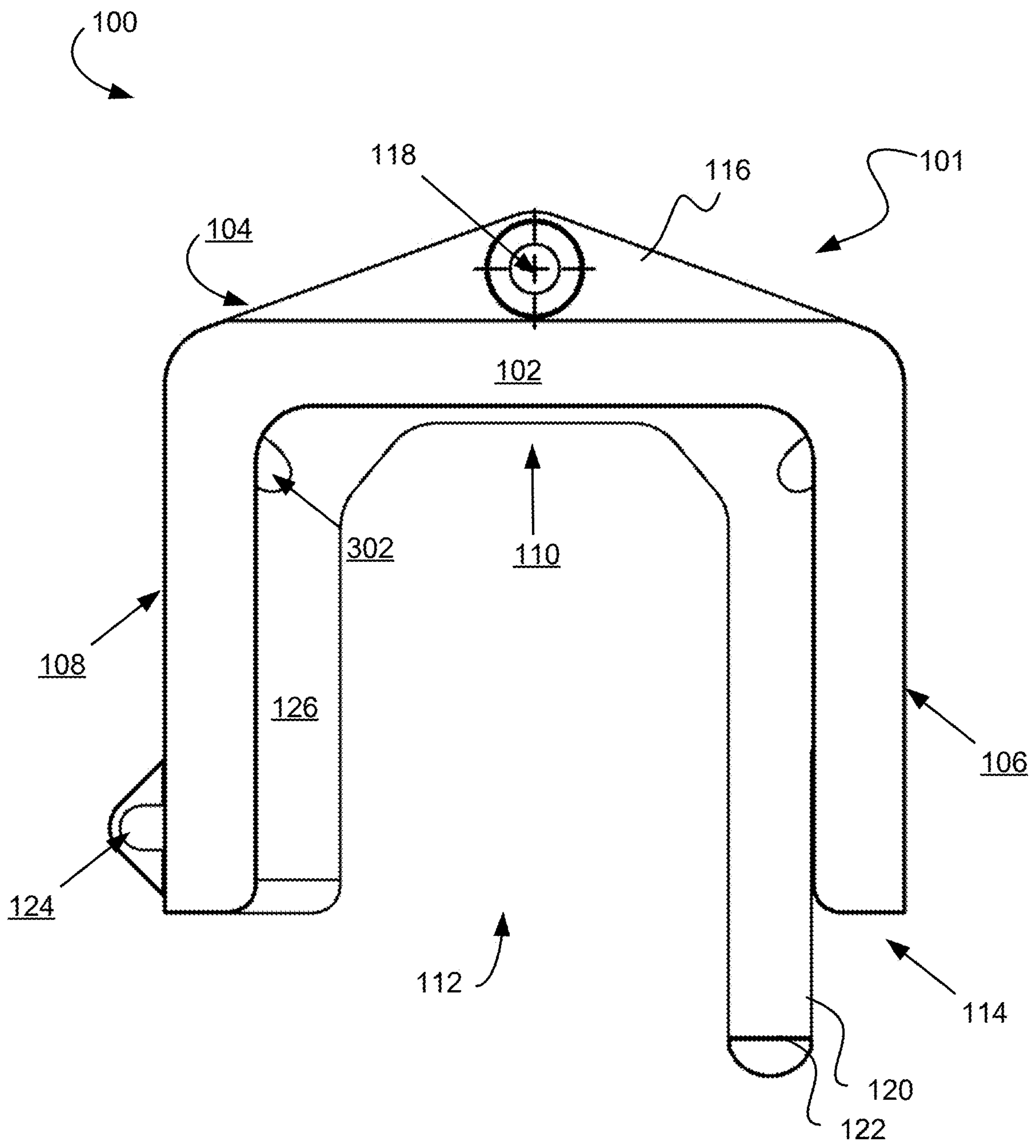
FIG. 3 is a front view of the MDU mount of FIG. 1, according to various embodiments of the present disclosure.

FIG. 3 is a front view of the MDU mount of FIG. 1. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 120 that engages with or otherwise slidably interfaces an STB inserted into the frame body 101.

In at least some embodiments, the MDU mount 100 further includes a mounting bracket 116 coupled to the frame body 101. The mounting bracket 116 may define one or more attachment points 118 for one or more fasteners (not shown). In various embodiments, the one or more attachment points 118 are sized and shaped for fasteners that are designed for mounting to a television or other electronic device. The one or more attachment points 116 may be further used with fasteners such as screws, nails, adhesives, or the like.

According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 3) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 3.

As shown in FIG. 3, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 3. In other embodiments, the stepped feature 122 and the spring clip 120 do not extend past the first end 114 of the frame body 101 and are not visible from a front view of the MDU mount 100.

According to at least some embodiments, the front side 102 and/or the back side 104 may have a portion removed such that at least 50% of the STB installed therein (not shown) is exposed through the front side 102 and/or the back side 104, to be described in further detail below. Having most of the front side 102 and/or the back side 104 of the frame body 101 removed reduces the amount of material used to form the MDU mount 100 and further reduces the weight of the MDU mount 100. Reducing the weight is especially advantageous as the MDU mount 100 may be mounted to an electronic device such as a television. Additionally, exposing one or more sides of the STB enables a user to view any status lights, use any buttons, etc., without removing the STB from the frame body 101 of the MDU mount 100. In yet further embodiments, exposing one or more sides of the STB enables a user to read a label, scan a bar code on the inserted unit, etc.

As shown in FIG. 3, the front side 102 may be smaller than the back side 104. For example, the front side 102 would cover less than a front surface of an STB than the back side 104 would cover of a back surface of the STB. In other embodiments, the front side 102 and the back side 104 are mirror images of one another. In yet further embodiments, the back side 104 is smaller than the front side 102.

In some embodiments, the frame body 101 includes at least one cable connector portion 124. The cable connector portion 124 may include an aperture, tie, or other means for gathering the cables of the STB and route them around the MDU mount 100. For example, it may be desirable for all the wires to be grouped together rather than loose and potentially tangled amongst one another as the wires extend from the STB and the MDU mount 100.

According to various embodiments, each of the front side 102, the back side 104, the right side 106, the left side 108, and the top side 110 includes an interior surface 126. Each interior surface 126 may interface with a corresponding surface of the STB when the STB is installed in the frame body 101 of the MDU mount 100. For example, at least the front side 102, the back side 104, the right side 106, and the left side 108 of the frame body 101 slidably interface with corresponding sides of the STB when the STB is inserted into the frame body 101.

One or more of the interior surfaces 126 of the frame body 101 includes one or more openings 302 for engaging corresponding "feet" or projections of the STB when the STB is fully inserted. In other embodiments, one or more projections (not shown) are provided such that the STB may be snug fit within the frame body 101. The one or more projections may provide frictional force which further maintains the STB within the frame body 101 once the STB is inserted into the frame body 101. Furthermore, the one or more projections on the interior surfaces 126 provide structural integrity to the frame body 101.

Figure 4:
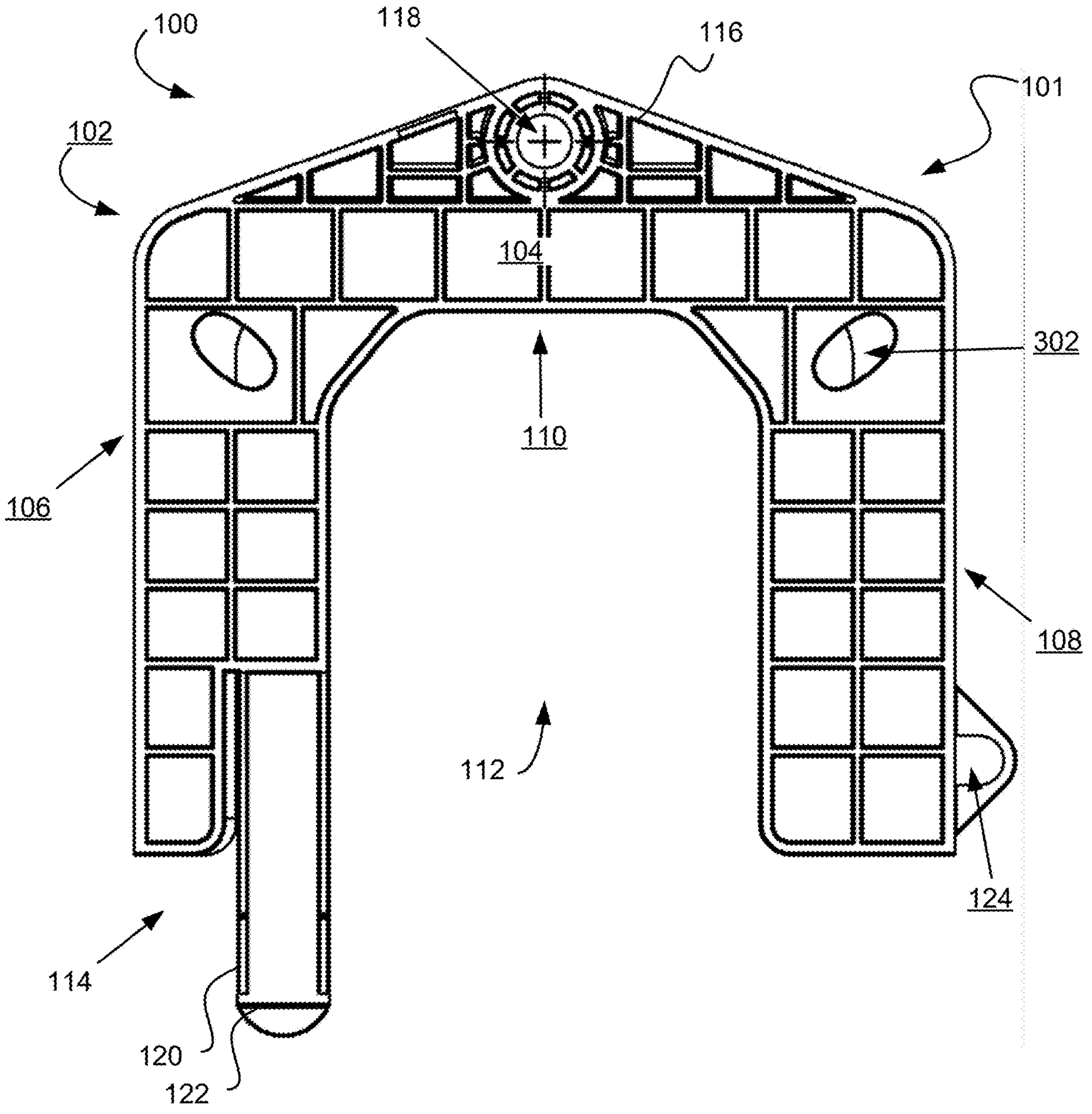
FIG. 4 is a rear view of the MDU mount of FIG. 1, according to various embodiments of the present disclosure.

FIG. 4 is a rear view of the MDU mount of FIG. 1. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 120 that engages with or otherwise slidably interfaces an STB inserted into the frame body 101.

In at least some embodiments, the MDU mount 100 further includes a mounting bracket 116 coupled to the frame body 101. The mounting bracket 116 may define one or more attachment points 118 for one or more fasteners (not shown). In various embodiments, the one or more attachment points 118 are sized and shaped for fasteners that are designed for mounting to a television or other electronic device. The one or more attachment points 116 may be further used with fasteners such as screws, nails, adhesives, or the like.

According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 3) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 4.

As shown in FIG. 4, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 4. In other embodiments, the stepped feature 122 and the spring clip 120 do not extend past the first end 114 of the frame body 101 and are not visible from a front view of the MDU mount 100.

According to at least some embodiments, the front side 102 and/or the back side 104 may have a portion removed such that at least 50% of the STB installed therein (not shown) is exposed through the front side 102 and/or the back side 104, to be described in further detail below. Having most of the front side 102 and/or the back side 104 of the frame body 101 removed reduces the amount of material used to form the MDU mount 100 and further reduces the weight of the MDU mount 100. Reducing the weight is especially advantageous as the MDU mount 100 may be mounted to an electronic device such as a television. Additionally, exposing one or more sides of the STB enables a user to view any status lights, use any buttons, etc., without removing the STB from the frame body 101 of the MDU mount 100. In yet further embodiments, exposing one or more sides of the STB enables a user to read a label, scan a bar code on the inserted unit, etc.

In some embodiments, the frame body 101 includes at least one cable connector portion 124. The cable connector portion 124 may include an aperture, tie, or other means for gathering the cables of the STB and route them around the MDU mount 100. For example, it may be desirable for all the wires to be grouped together rather than loose and potentially tangled amongst one another as the wires extend from the STB and the MDU mount 100.

According to various embodiments, each of the front side 102, the back side 104, the right side 106, the left side 108, and the top side 110 includes an interior surface 126. Each interior surface 126 may interface with a corresponding surface of the STB when the STB is installed in the frame body 101 of the MDU mount 100. For example, at least the front side 102, the back side 104, the right side 106, and the left side 108 of the frame body 101 slidably interface with corresponding sides of the STB when the STB is inserted into the frame body 101.

One or more of the interior surfaces 126 of the frame body 101 includes one or more openings 302 for engaging corresponding "feet" or projections of the STB when the STB is fully inserted. In other embodiments, one or more projections (not shown) are provided such that the STB may be snug fit within the frame body 101. The one or more projections may provide frictional force which further maintains the STB within the frame body 101 once the STB is inserted into the frame body 101. Furthermore, the one or more projections on the interior surfaces 126 provide structural integrity to the frame body 101.

Figure 5:
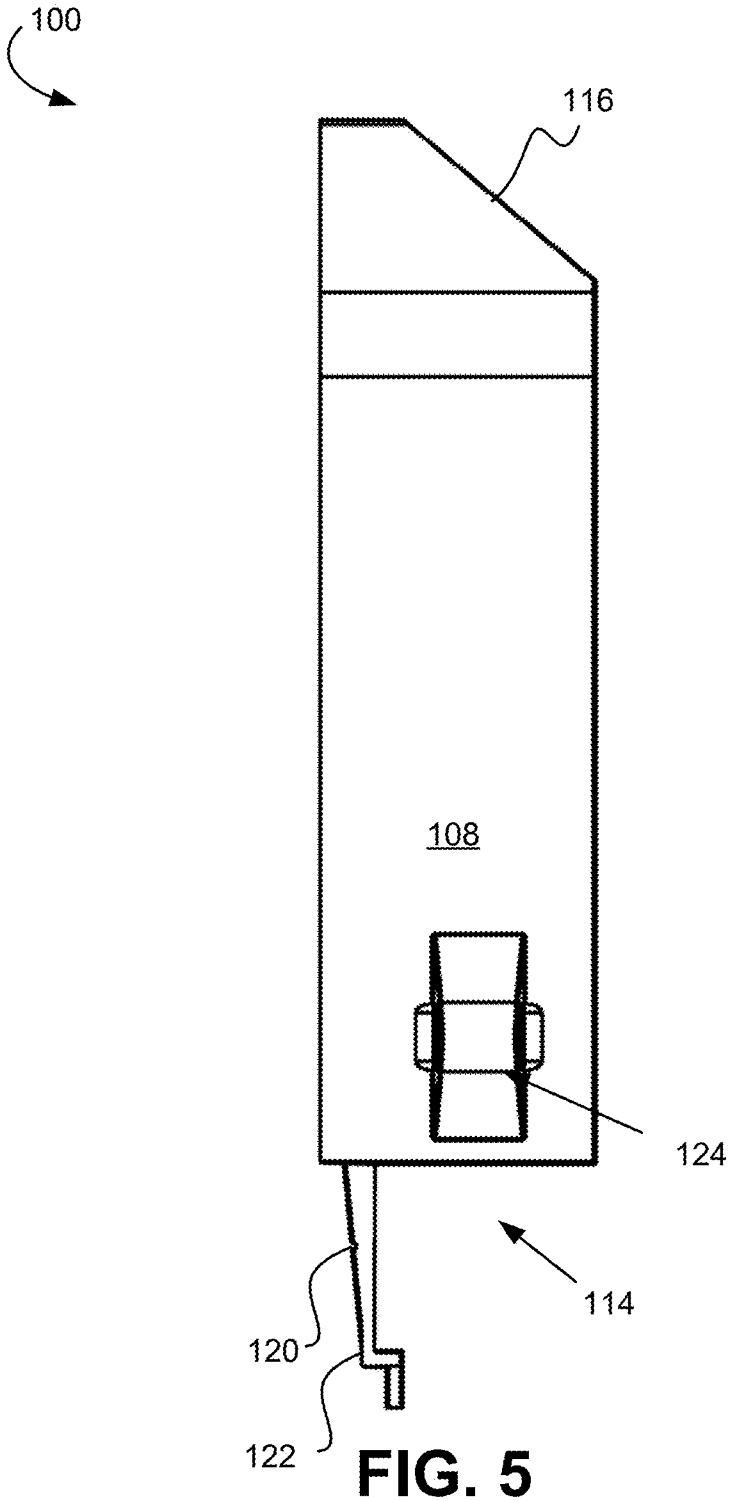
FIG. 5 is a side view of the MDU mount of FIG. 1, according to various embodiments of the present disclosure.

FIG. 5 is a side view of the MDU mount of FIG. 1. In at least some embodiments, the MDU mount 100 includes a mounting bracket 116 coupled to the frame body 101. According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 4) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 5.

As shown in FIG. 5, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 5. In other embodiments, the stepped feature 122 and the spring clip 120 do not extend past the first end 114 of the frame body 101 and are not visible from a front view of the MDU mount 100.

In some embodiments, the frame body 101 includes at least one cable connector portion 124. The cable connector portion 124 may include an aperture, tie, or other means for gathering the cables of the STB and route them around the MDU mount 100. For example, it may be desirable for all the wires to be grouped together rather than loose and potentially tangled amongst one another as the wires extend from the STB and the MDU mount 100.

Figure 6:
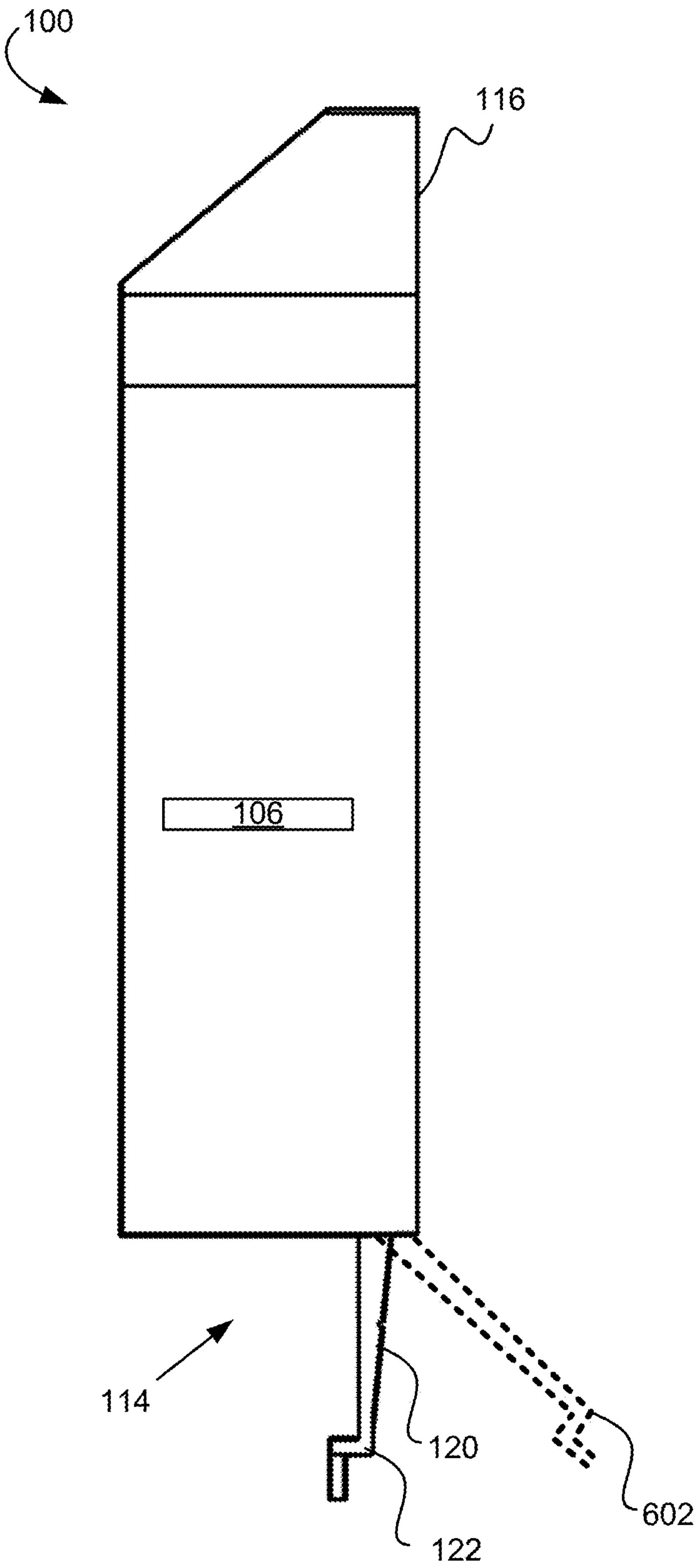
FIG. 6 is another side view of the MDU mount of FIG. 1, according to various embodiments of the present disclosure.

FIG. 6 is another side view of the MDU mount of FIG. 1. In at least some embodiments, the MDU mount 100 includes a mounting bracket 116 coupled to the frame body 101. According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in other figures and in solid line in FIG. 6) and a flexed position 602 (as shown by the dotted line) when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 6.

As shown in FIG. 6, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 6. In other embodiments, the stepped feature 122 and the spring clip 120 do not extend past the first end 114 of the frame body 101 and are not visible from a front view of the MDU mount 100.

Figure 7:
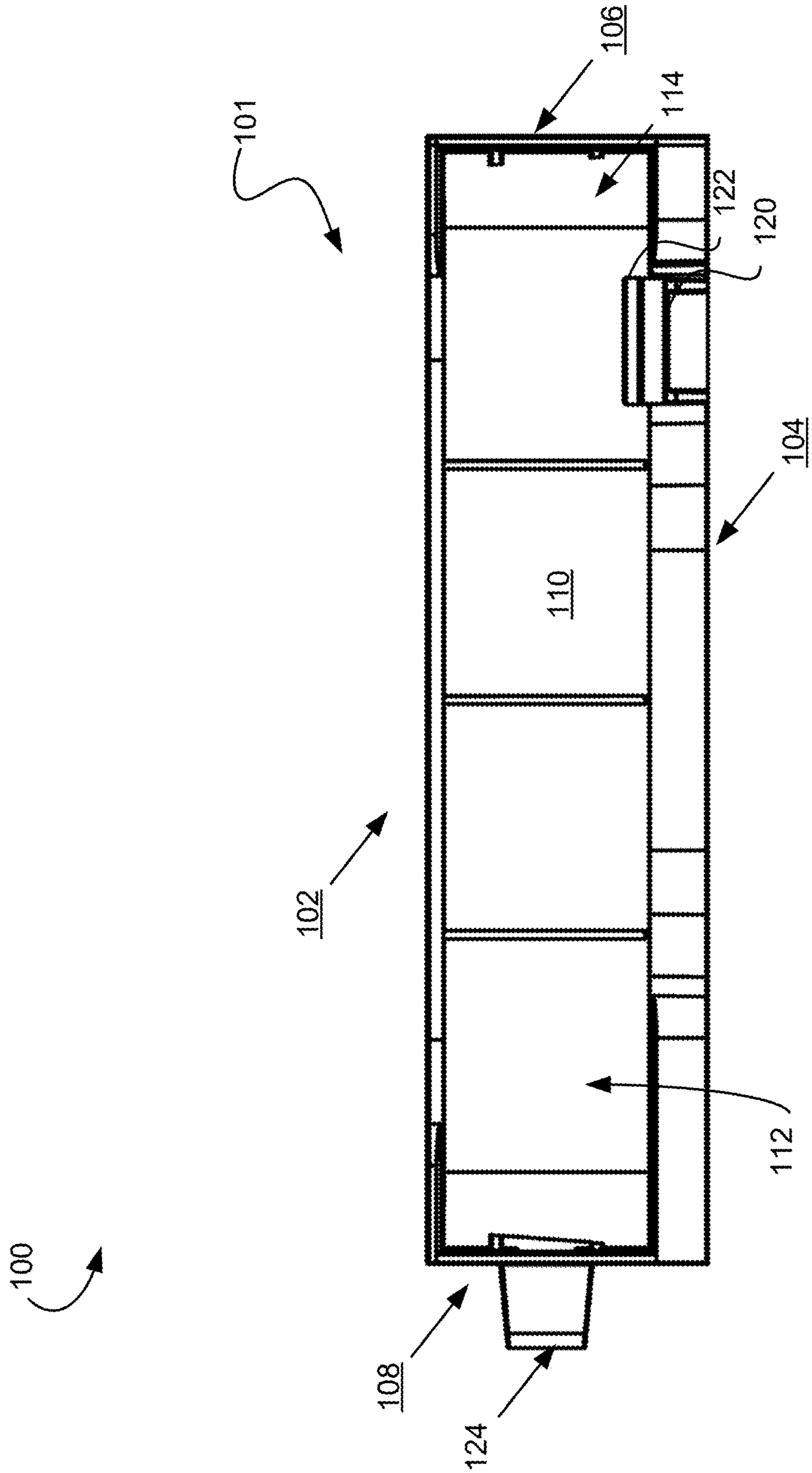
FIG. 7 is a bottom view of the MDU mount of FIG. 1, according to various embodiments of the present disclosure.

FIG. 7 is a bottom view of the MDU mount of FIG. 1. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 120 that engages with or otherwise slidably interfaces an STB inserted into the frame body 101.

In various embodiments, the MDU mount 100 may further include a spring clip 120 extending away from the frame body 101 beyond the opening 112 at the first end 114 of the frame body 101. The spring clip 120 may be configured to removably secure the set top box (not shown) within the frame body 101 when the set top box is installed into the frame body 101 through the opening 112. The spring clip 120 may be sized and shaped to be flexible enough to transition between an unflexed position (as shown in FIG. 1) and a flexed position when an STB is being inserted into the frame body 101. The spring clip 120 flexes until the STB is fully inserted and the spring clip 120 returns to an unflexed position such that the spring clip 120 engages with at least one sides of the STB.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

As shown in FIG. 7, the spring clip 120 may include a stepped feature 122 that engages with a bottom surface of the STB to maintain the STB within the frame body 101, to be described in further detail below. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 7. In other embodiments, the stepped feature 122 and the spring clip 120 do not extend past the first end 114 of the frame body 101 and are not visible from a front view of the MDU mount 100.

In some embodiments, the frame body 101 includes at least one cable connector portion 124. The cable connector portion 124 may include an aperture, tie, or other means for gathering the cables of the STB and route them around the MDU mount 100. For example, it may be desirable for all the wires to be grouped together rather than loose and potentially tangled amongst one another as the wires extend from the STB and the MDU mount 100.

According to various embodiments, each of the front side 102, the back side 104, the right side 106, the left side 108, and the top side 110 includes an interior surface 126. Each interior surface 126 may interface with a corresponding surface of the STB when the STB is installed in the frame body 101 of the MDU mount 100. For example, at least the front side 102, the back side 104, the right side 106, and the left side 108 of the frame body 101 slidably interface with corresponding sides of the STB when the STB is inserted into the frame body 101.

Figure 8:
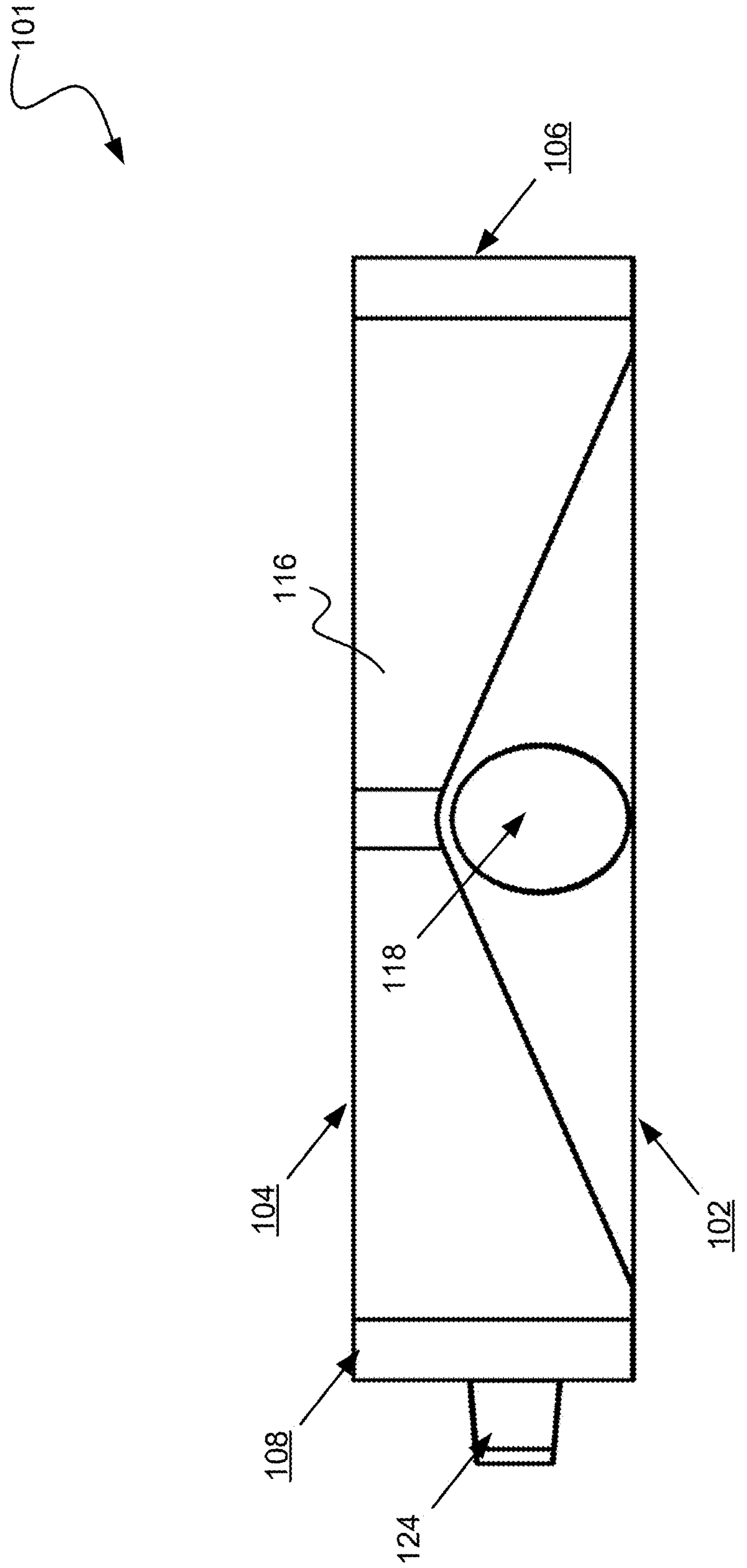
FIG. 8 is a top view of the MDU mount of FIG. 1, according to various embodiments of the present disclosure.

FIG. 8 is a top view of the MDU mount of FIG. 1. The MDU mount 100 may include a frame body 101. The frame body 101 may include at least five sides. For example, the MDU mount 100 includes a front side 102 (also referred to herein as a first side), a back side 104 (also referred to herein as a second side), a right side 106, a left side 108, and a top side 110. According to various embodiments, the front side 102 and the back side 104 define an opening 112 for inserting an STB box within the frame body 101. In further embodiments, the front side 102, the back side 104, the right side 106, the left side 108, and the top side 110 define the opening 112 at a first end 114 of the frame body 101. Each of the sides of the frame body 101 may have a corresponding interior surface 120 that engages with or otherwise slidably interfaces an STB inserted into the frame body 101.

In at least some embodiments, the MDU mount 100 further includes a mounting bracket 116 coupled to the frame body 101. The mounting bracket 116 may define one or more attachment points 118 for one or more fasteners (not shown). In various embodiments, the one or more attachment points 118 are sized and shaped for fasteners that are designed for mounting to a television or other electronic device. The one or more attachment points 116 may be further used with fasteners such as screws, nails, adhesives, or the like.

According to at least some embodiments, the mounting bracket 116 may be integrated with the frame body 101. For example, the mounting bracket 116 and the frame body 101 may be formed of a single unitary piece. In other embodiments, the mounting bracket 116 is coupled to the frame body 101 via an adhesive, a fastener such as a screw, nail, or the like, hook and loop fasteners, etc.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In some embodiments, the frame body 101 includes at least one cable connector portion 124. The cable connector portion 124 may include an aperture, tie, or other means for gathering the cables of the STB box and route them around the MDU mount 100. For example, it may be desirable for all the wires to be grouped together rather than loose and potentially tangled amongst one another as the wires extend from the STB and the MDU mount 100.

Figure 9:
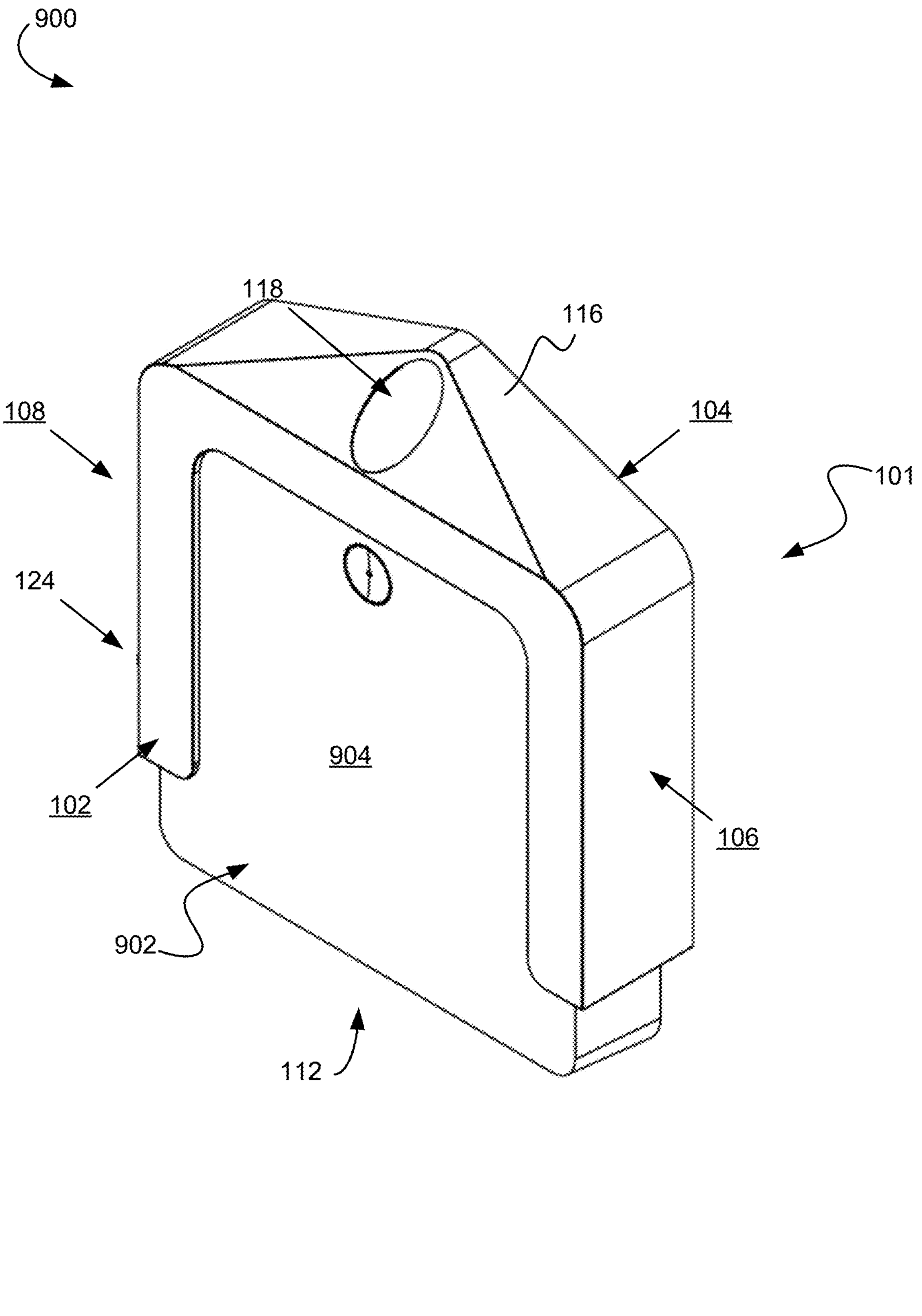
FIG. 9 is an isometric front view of an MDU mount having a set top box installed therein, according to various embodiments of the present disclosure.

FIG. 9 is an isometric front view of an MDU mount having a set top box installed therein. The system 900 may include an MDU mount 100 as described with respect to FIGS. 1-8. The system 900 may further include a STB 902. The STB 902 may include at least a front side 904 and various other sides that are not visible in FIG. 9. The front side 904 may slidably interface with the front side 102 of the MDU mount 100 as described in detail above.

Figure 10:
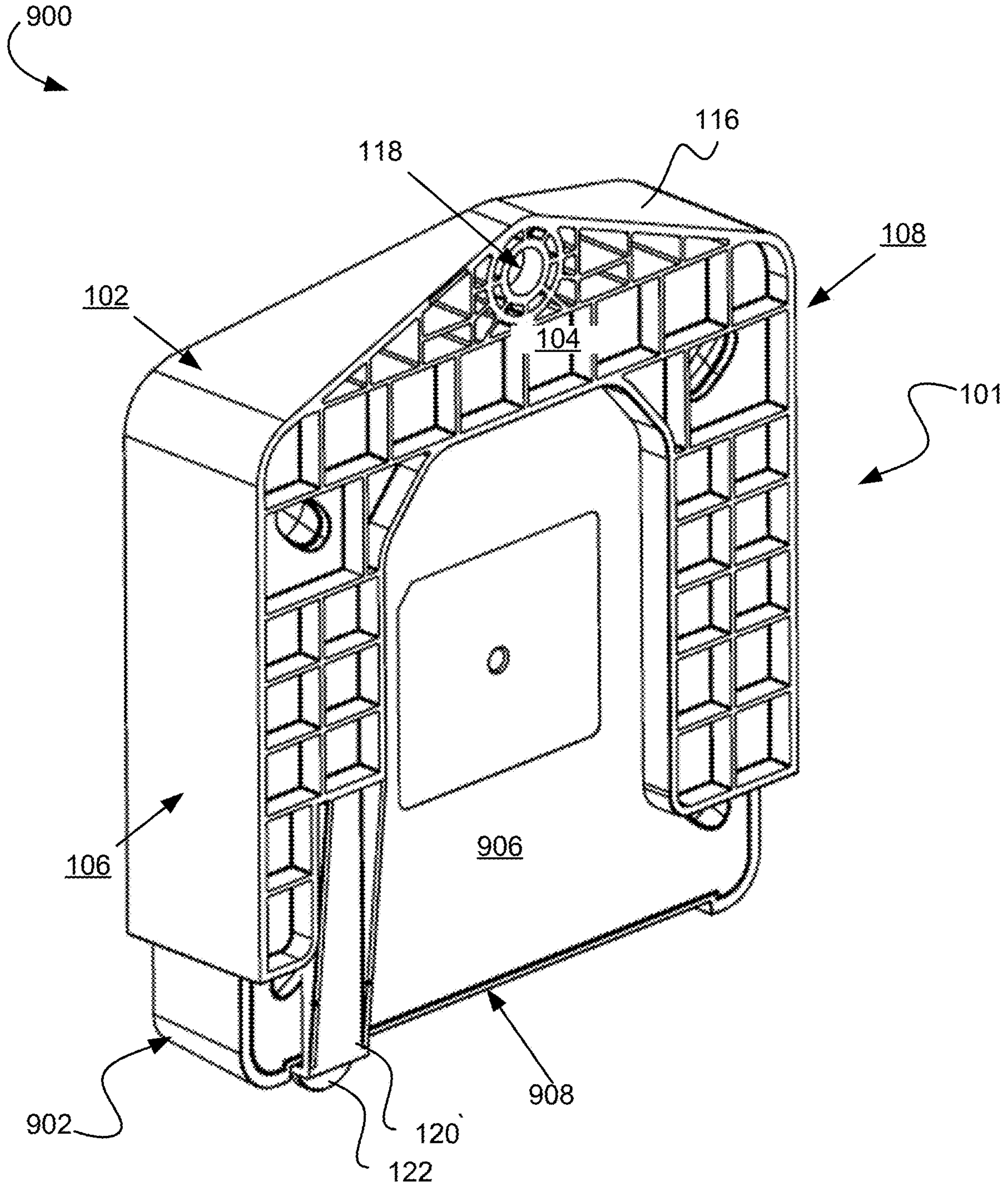
FIG. 10 is an isometric rear view of the MDU mount having the set top box installed therein of FIG. 9, according to various embodiments of the present disclosure.

FIG. 10 is an isometric rear view of the MDU mount having the set top box installed therein of FIG. 9. The system 900 may include an MDU mount 100 as described with respect to FIGS. 1-8. The system 900 may further include a STB 902. The STB 902 may include at least a back side 906 and various other sides that are not visible in FIG. 9. The back side 906 may slidably interface with the back side 104 of the MDU mount 100 described in detail above.

In various embodiments, the MDU mount 100 may further include a spring clip 120 extending away from the frame body 101 beyond the opening 112 at the first end 114 of the frame body 101. The spring clip 120 may be configured to removably secure the STB 902 within the frame body 101 when the STB 902 is installed into the frame body 101 through the opening 112. The spring clip 120 may be sized and shaped to be flexible enough to transition between an unflexed position (as shown in FIG. 10) and a flexed position when an STB is being inserted into the frame body 101. The spring clip 120 flexes until the STB 902 is fully inserted and the spring clip 120 returns to an unflexed position such that the spring clip 120 engages with at least one sides of the STB 902.

In at least some embodiments, the spring clip 120 is integrally formed with the frame body 101. For example, the spring clip 120 and the frame body 101 may be formed of a single unitary piece. Furthermore, the spring clip 120, the frame body 101, and the mounting bracket 116 may be all formed of a single unitary piece, e.g., formed from a single piece of material.

In various embodiments, the spring clip 120 extends past one or more of the front side 102, the back side 104, the right side 106, or the left side 108 of the frame body 101. In an exemplary embodiment, the spring clip 120 extends past the front side 102 and the back side 104 of the frame body 101 as shown in FIG. 10.

As shown in FIG. 1, the spring clip 120 may include a stepped feature 122 that engages with a bottom surface 908 of the STB 902 to maintain the STB 902 within the frame body 101. The spring clip 120 may include alternative features, such as a notch to insert another stepped feature or the like, along a length of the spring clip 120 for use with different sized STBs. The stepped feature 122 may be below the first end 114 of the frame body 101 as shown in FIG. 1. In other embodiments, the stepped feature 122 and the spring clip 120 do not extend past the first end 114 of the frame body 101 and are not visible from a front view of the MDU mount 100.

According to at least some embodiments, the front side 102 and/or the back side 104 may have a portion removed such that at least 50% of the front side 904 of the STB 902 and/or the back side 906 of the STB 902 are exposed through the front side 102 and/or the back side 104 of the frame body 101 of the MDU mount 100, respectively. Having most of the front side 102 and/or the back side 104 of the frame body 101 removed reduces the amount of material used to form the MDU mount 100 and further reduces the weight of the MDU mount 100. Reducing the weight is especially advantageous as the MDU mount 100 may be mounted to an electronic device such as a television. Additionally, exposing one or more sides of the STB 902 enables a user to view any status lights, use any buttons, etc., without removing the STB 902 from the frame body 101 of the MDU mount 100.

The description provides exemplary embodiments, and is not intended to limit the scope, applicability, or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A television receiver mounting device, comprising:

a frame body comprising a front side, a back side, a top side, a right side, and a left side that form an opening at a first end of the frame body opposite of the top side, wherein the opening allows a television receiver to removably be inserted into the frame body;

a mounting bracket coupled to the frame body defining one or more attachment points for one or more fasteners; and a spring clip extending away from the back side of the frame body beyond the opening at the first end of the frame body, wherein the spring clip is configured to removably secure the television receiver within the frame body when the television receiver is installed into the frame body through the opening.

2. The device of claim 1, wherein the spring clip, the mounting bracket, and the frame body form a single unitary piece.

3. The device of claim 1, wherein the spring clip extends past the front side and the back side of the frame body.

4. The device of claim 3, wherein the opening is defined between at least the front side and the back side.

5. The device of claim 1, wherein the mounting bracket is mountable to an electronic device.

6. The device of claim 1, wherein one or more interior surfaces of the frame body comprise one or more projections for the television receiver to be snug fit within the frame body.

7. The device of claim 1, wherein the frame body comprise a cable connector portion.

8. The device of claim 1, wherein the spring clip flexes until the television receiver is fully inserted and wherein the spring clip returns to an unflexed position such that the spring clip engages with at least one sides of the television receiver.

9. The device of claim 1, wherein the front side of the frame body defines an void such that more than 50% of a front surface and/or a back surface of the television receiver is exposed when the television receiver is installed into the frame body.

10. The device of claim 1, wherein the television receiver is a set top box.

11. A system for mounting a television receiver, comprising:

a television receiver comprising at least a front side and a back side;

a mounting device comprising:

a frame body comprising a front side, a back side, a top side, a right side, and a left side that form an opening at a first end of the frame body opposite of the top side, wherein the television receiver is slidably installed within the frame body through the opening; and a spring clip extending away from the back side of the frame body and beyond the opening at the first end of the frame body, wherein the spring clip is configured to removably secure the television receiver within the frame body when the television receiver is installed into the frame body through the opening.

12. The system of claim 11, further comprising a mounting bracket coupled to the frame body defining one or more attachment points for one or more fasteners.

13. The system of claim 12, wherein the mounting bracket is mountable to an electronic device.

14. The system of claim 11, wherein the opening is defined between at least the front side and the back side.

15. The system of claim 14, wherein the front side of the television receiver slidably interfaces with the front side of the frame body and the back side of the television receiver slidably interfaces with the back side of the frame body.

16. The system of claim 14, wherein more than 50% of the front side is exposed through the front side of the frame body when the television receiver is installed into the frame body.

17. The system of claim 14, wherein the front side of the frame body defines an void such that more than 50% of the back side is exposed through the front side of the frame body when the television receiver is installed into the frame body.

18. The system of claim 14, wherein the spring clip extends past the front side and the back side of the frame body.

19. The system of claim 11, wherein the spring clip and the frame body form a single unitary piece.

20. The system of claim 11, wherein the television receiver is a set top box.

* * * * *